United States Patent [19]

Nannen

[11] 4,084,395
[45] Apr. 18, 1978

[54] WORKING VEHICLE

[76] Inventor: William G. Nannen, P.O. Box 242, Smethport, Pa. 16749

[21] Appl. No.: 676,891

[22] Filed: Apr. 14, 1976

Related U.S. Application Data

[63] Continuation-in-part of Ser. No. 520,153, Nov. 1, 1974, abandoned.

[51] Int. Cl.² .......................................... A01D 35/26
[52] U.S. Cl. ............................... 56/15.4; 56/13.4; 56/15.3; 56/17.2; 56/17.5; 180/43 A
[58] Field of Search ................. 56/13.3, 13.4, 15.4, 56/16.9, 17.2, 17.5, 25 S, 14.9, 15.3; 180/43 A, 43 R

[56] References Cited

U.S. PATENT DOCUMENTS

| | | | |
|---|---|---|---|
| 1,249,996 | 12/1917 | Olsen | 180/43 A |
| 2,522,112 | 9/1950 | Gilmour | 56/17.2 |
| 2,825,196 | 3/1958 | Gudmundsen | 56/17.2 X |
| 2,953,888 | 9/1960 | Phillips, Jr. | 56/13.4 |
| 2,968,902 | 1/1961 | Brown | 56/14.9 |
| 3,112,594 | 12/1963 | Hallenbeck | 56/16.9 X |
| 3,141,283 | 7/1964 | Swindler | 56/17.2 |
| 3,822,757 | 7/1974 | Spence | 180/43 A |

Primary Examiner—Jay N. Eskovitz
Attorney, Agent, or Firm—Lane, Aitken, Dunner & Ziems

[57] ABSTRACT

A working vehicle, for example, a lawn mower, floor brush, or snowblower, is disclosed wherein a steerable ground-engaging wheel is located within the sweep of a rotary mechanism. A spindle portion of the wheel is journaled in a sleeve portion of the rotating mechanism and the mechanism is operatively connected to a power source by a power transfer system. The wheel and the rotary mechanism are independently rotatable. Apparatus is provided in both the single cutter and multiple cutter embodiments to adjust the height of the rotary mechanism as a unit. An alternate drive mechanism is disclosed for use with such devices in which a ground-engaging wheel interior of the rotating mechanism is individually powered. In another embodiment, the wheel is castered. Each of the rotating mechanisms includes a rotatable member rotatably supported within a receiving portion of a body which includes a plurality of support wheels. One of the supporting wheels includes a spindle rotatably journaled within and adjacent to the rotatable member. Cutting blades, brushes, or snow blowing attachments may be secured to the rotatable member.

9 Claims, 11 Drawing Figures

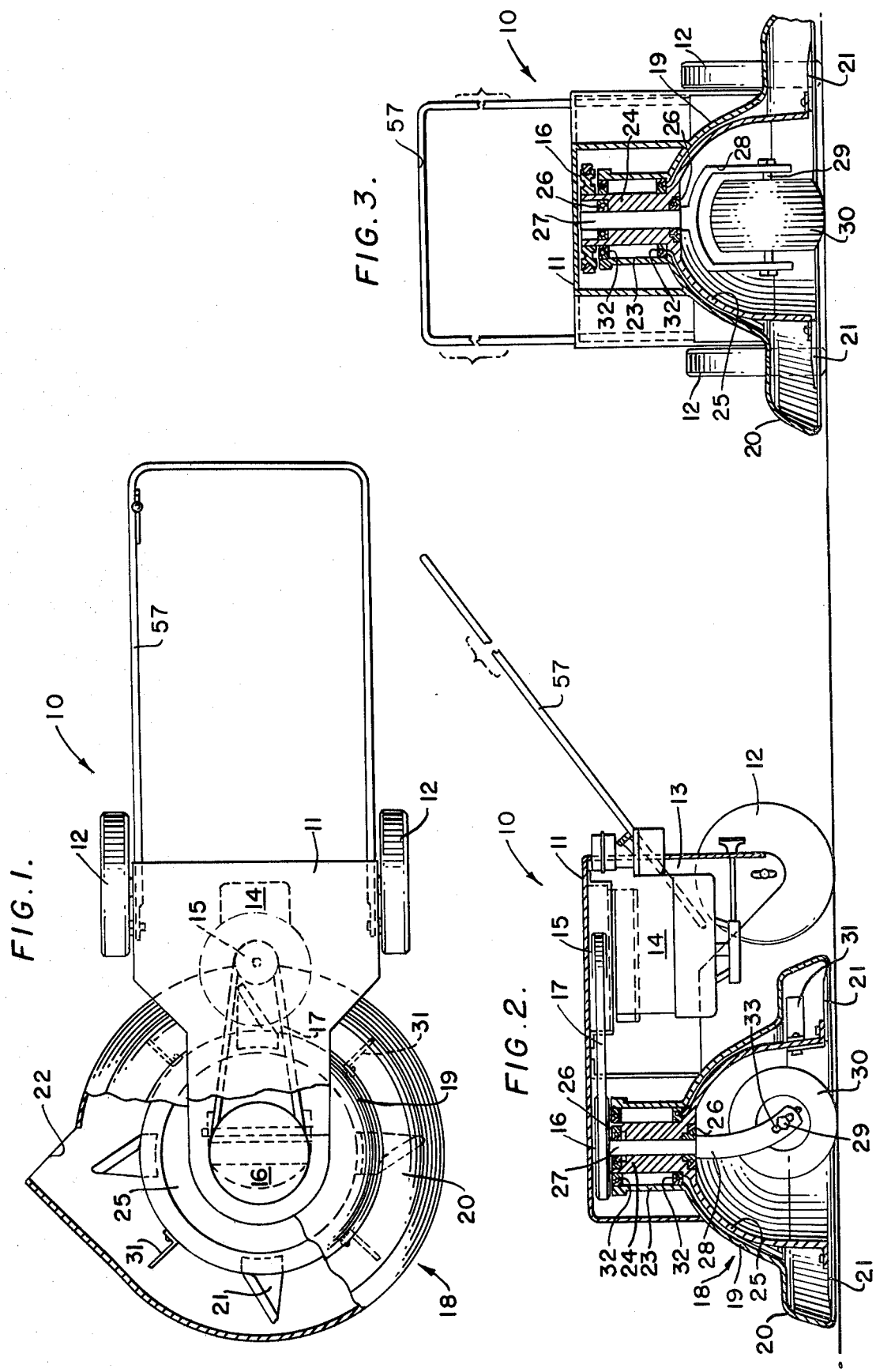

WORKING VEHICLE

CROSS-REFERENCE TO RELATED APPLICATIONS

This application is a continuation-in-part of the applicant's copending U.S. application, Ser. No. 520,153, filed Nov. 1, 1974 now abandoned.

BACKGROUND OF THE INVENTION

This invention relates to a power apparatus in which a steerable, ground-engaging support wheel is contained within the interior of the sweep of a rotary mechanism. More particularly, this invention relates to a power apparatus such as a lawn mower, snowblower, or rotary floor brush, using such a rotary mechanism. Still more particularly, this invention relates to such an apparatus wherein the rotating mechanism is supported by at least one wheel which is mounted on a fork, a spindle portion of which is journaled within a portion of the rotating mechanism and thus within the annular area swept by the rotating mechanism. Still more particularly, this invention relates to such an apparatus in which the power apparatus includes means for adjusting the rotating mechanism as a unit, whether one or more of such rotary mechanisms are utilized, and means for individually driving the ground-engaging wheel within the rotary mechanism.

As disclosed in the applicant's copending application, mentioned above, the positioning of supporting wheels within the annual cutting blades of a lawn mower is known to the art as disclosed, for example, in U.S. Pat. Nos. 797,596, 2,121,749, 3,141,283 and 3,516,234. The latter patent discloses a steerable ground-engaging wheel located intermediate the sweep of a rotatable cutting mechanism, but, among other differences, no convenient means are provided for adjusting the height of the cutting mechanism as a unit, or for independently driving the steerable ground-engaging wheel. Moreover, only an embodiment in which a single wheel is used at the front of the vehicle is shown and multiple steerable wheels of the type described are not suggested.

Similarly, U.S. Pat. No. 3,141,283 discloses a similar type of cutting mechanism which emphasizes an arrangement in which a rotary shaft is rotatable about at least one of the supporting wheels. The supporting wheel includes a spindle rotary journaled within the rotatable member and both the rotatable member and the spindle combination are rotatably journaled within the body of the mower. In this apparatus as well, height adjustment of the cutter is inconvenient and the wheel is not driven. Furthermore, a single such wheel is used and arrays of such wheels are not suggested.

In connection with an apparatus of the type disclosed, it has been a problem in the art to provide a mechanism for conveniently raising and lowering the adjusting height of the rotary mechanism, particularly in a lawn mower embodiment. While significant advantages were obtained from the use of the concept of a journal-within-a-journal for permitting the independent rotation of the cutting blade and the steering of the supporting wheel independently from one another, adjustment of the cutting height had not been attractively convenient. The problem was magnified when considering a multiple wheel arrangement such as in a rotary brush where it might be desired to steer flexibly, linearly and laterally, such a vehicle to brush in tight corners, closely adjacent to objects, and the like. Accordingly, it is a broad aim of this invention to provide means for conveniently adjusting such a rotary mechanism as a unit, whether one or more of such mechanisms are used, in the power apparatus to a convenient height.

In addition, it is desirable in the art to provide a means for individually powering the ground-engaging steerable wheel of such an apparatus in order to provide a multiple cutting or brushing device. While certain advantages are obtained by powering the front wheels of such a device in an embodiment which uses a plurality of rearwardly fixed ground-engaging wheels, where the device includes a plurality of such rotary mechanisms, it is desirable to individually power each of the cutting wheels for steering flexibility in the device. Accordingly, it is another aim of this invention to provide a device of the type described which features individually powering each of these types of wheel assemblies.

In the patents discussed above, a single steerable ground-engaging wheel is used in conjunction with a pair of rearward ground-engaging wheels. In a number of applications, it is desirable to extend the width of the cutting or brushing path by using a plurality of rotary mechanisms, each of which is disposed about an independently steerable wheel. In many of these applications, it is further desirable to drive individually each of the independently steerable wheels. Accordingly, embodiments are disclosed which provide such capability and in which the cutting or brushing height of the rotary mechanism is conveniently adjustable. Moreover, all of the wheels of the vehicle, preferably in a three-wheel embodiment, can comprise suitable wheels with the feature mentioned above. In the alternative, one or more steerable wheels can be located in either the forward or rearward portion of the vehicle.

Still further, and in another embodiment of the basic invention, it is desired to provide a canted or sloped caster to such an arrangement while permitting the free rotation of the mechanism.

Accordingly, it is a broad objective of this invention to provide a device of the type described having the additional features and capabilities of unitary height adjustment, and individually powering the steerable ground-engaging wheel.

These and other advantages will become apparent from the detailed description of the invention taken in conjunction with the accompanying drawings.

SUMMARY OF THE INVENTION

Directed to achieving the aforestated objects and overcoming the problems of the prior art and in order to improve upon the embodiment disclosed in the applicant's copending application, this invention relates to a power apparatus which comprises a body which includes a plurality of ground-engaging supporting wheels. A rotatable member is rotatably supported within the receiving portion of the body and is rotatable about at least one of the supporting wheels. That supporting wheel is steerable and includes a spindle rotatably journaled within and adjacent to the rotatable member. Power means are supported on the body for rotating the rotatable member independent of the steering of the vehicle.

Means are provided for adjusting the cutting height of such a mechanism as a unit. When a single steerable assembly is utilized, the unit is conveniently adjusted by means of a mechanical linkage. When a plurality of such rotating mechanisms are utilized, the height adjustment mechanism includes a plurality of connections for raising and lowering the cutting height as a unit.

In an alternate embodiment, one or more of the steerable ground-engaging wheels of such a device are individually powered by means of a shaft intermediate the rotatable member. The rotating power shaft is connected by bevel gears to a chain drive mechanism for powering the ground-engaging wheel. In an embodiment which includes a plurality of such brushing or cutting mechanism, significant advantages are obtained in terms of the steering flexibility of the vehicle.

BRIEF DESCRIPTION OF THE DRAWINGS

In the drawings:

FIG. 1 is a plan view, partially broken away to show a portion of the cutting blades, of an apparatus according to the invention and illustrating the operative pulley and power source in phantom;

FIG. 2 is a vertical section of the embodiment shown in FIG. 1 depicting the steerable ground-engaging wheel within the sweep of the rotary mechanism;

FIG. 3 is a vertical section of the embodiment of FIG. 1 taken on the plane extending at right angles to the section shown in FIG. 2;

DETAILED DESCRIPTION OF THE PREFERRED EMBODIMENTS

Figure 4:
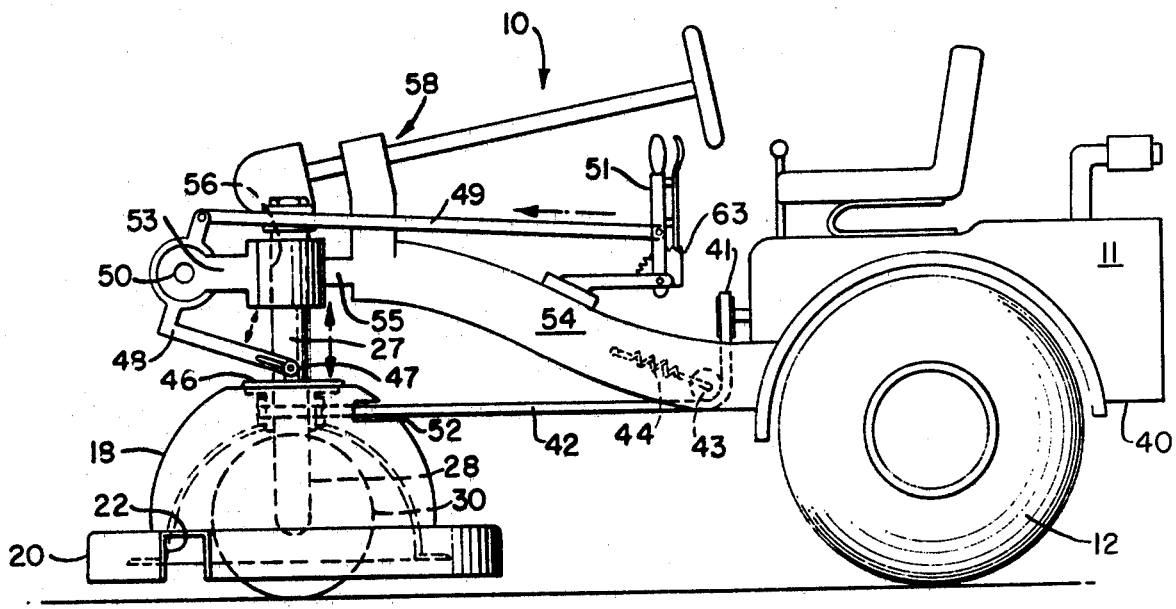
FIG. 4 is a side view of an embodiment utilizing a wheel and rotary mechanism as shown in FIGS. 1–3 wherein the height of the cutting unit is vertically adjustable by a height-adjusting mechanism.

FIGS. 1—3 are taken in duplicate from the applicant's copending application Ser. No. 520,153 to provide a descriptive basis for the basic combination of a ground-engaging steerable wheel within a rotary mechanism as used in certain other embodiments of this application.

As indicated in that application, the embodiment illustrated in FIGS. 1–3 comprises an apparatus, designated generally by the reference numeral 10, such as a lawn mower having a sheet metal housing 11 supported on rearward ground-engaging wheels 12 which are rotatably mounted on suitable depending portions 13 of the housing 11. A conventional power source or motor 14 is supported within the frame with any suitable means and operatively connected to a driving pulley 15. The pulley 15 is connected to a driven pulley 16 by an endless belt 17 which may be formed of rubber or other suitable material. The driven pulley 16 and the connecting belt 17 are also connected within the main housing 11.

A shell or safety covering shown generally by the reference numeral 18, is secured, as by welding, to the edge parts of the forward portion of the housing 11. A major portion 19 of the shell 18 is of a conical form, the bottom portion 20 having a flange extending outwardly from the conical portion and a dependent part substantially to form a channel or annular area in which the blades 21 rotate. An outlet 22 may be provided in this channel area to allow for disposal of cut grass. In addition, the blades 21 may be replaced by a suitable annular brush to form a brushing apparatus, or by laterally extending wider blades to form a snow blowing apparatus. In the latter case, the outlet 22 may be quite wide to permit the exit of snow from the apparatus.

Journaled within an opening in the upper portion 23 of the shell is a rotatable, axially extending, tubular sleeve portion 24 of the bell-shaped cutting mechanism 25. The top portion of the sleeve 24 is secured by any suitable means to the driven pulley 16 to provide an operative connection between the cutting mechanism 25 and the power source 14. Suitable bearings 26 are provided in the top and the bottom wells of the sleeve 24 to faciliate rotation of the sleeve 24 about the spindle portion 27 of a pivotal fork, the bifurcated arms 28 of which support an axle 29 on which the ground engaging steerable wheel is mounted. The axle 29 is adjustable within slots 33 and the arms 28 so as to permit the cutting of grass at different heights.

A plurality of bearings 32 are frictionally fitted within the inside diameter of the opening in the top portion of the shell 18 adjacent the sleeve portion 24 to aid rotation of the cutting mechanism within the shell. The bottom part of the bell-shaped cutting mechanism 25 has a flange portion on which a plurality of blades 21 are secured by any suitable means. The fan blades 31 may also be secured on spaced bottom portions of the bell-shaped mechanism to provide a blower effect within the channel 20. The lawn mower is also provided with an unwardly and rearwardly extending U-shaped handle member 57 which extends from the rear portion of the frame 11, its legs being secured thereto by any suitable means, such as bolting or welding, so that an operator standing at the rear of the machine can readily maneuver it. Since the entire weight of the cutting mechanism shell 18 is placed on the wheel 30, a greater balance is achieved and the machine is relatively easy to manuever.

As indicated in the applicant's copending application, various modifications of this basic drive mechanism may be utilized, including the self-contained rideable embodiments and the like.

FIG. 4 is a side view of a rideable type mower wherein like reference numerals have been assigned to like parts as in connection with FIGS. 1–3. In this embodiment, the motor 14 is secured in a rearward compartment 40 in the housing 11 for driving a pulley 41 to which is secured an endless belt 42 for driving the cutting mechanism. A tensioning pulley 43 biased by a spring 44 provides tension for the change of direction of the belt 42. In the forward end of the device as shown in FIG. 4, the cooperation of the cutting mechanism and the steerable wheel 30 is as described in connection with FIGS. 1–3 and the belt 42 in FIG. 4 serves the same drive function as the belt 17 in FIGS. 1–3.

One of the advantages of this embodiment is that the cutting mechanism 25 may be vertically adjusted as a unit in order to raise or lower the cutting height of the blades 31. Specifically, the upper portion 46 of the shell 18 has a connecting member 47 secured to a generally L-shaped pivotal member 48 connected to a member 49 about a pivot 50 to an adjustment handle 51 which may be fixed in any one of the positions determined by a fixing ratchet 63. The details of such a mechanism are well known to the art. By this height-adjusting mechanism, the upper portion 46, to which is secured the shell 18, may be raised or lowered, permitting the sleeve 24 and the bearings 26 to raise or lower relative to the spindle 27. In this case, the bearings 26 are laterally slideable along the spindle 27. An opening 52 in the shell is sufficiently large to receive the belt 42 at various heights, varying on the order of 1 to 3 inches or so.

The housing 11 of the embodiment of FIG. 4 includes a rigid intermediate portion 54 connected at its forward end to a forwardly extending member 55 having an opening 56 therein to receive a spindle 27 which is integral with or attached to the fork secured to the wheel 30. The upper end of the spindle 27 is steeringly connected to the steering wheel assembly 58, the details of which are within the skill of the art.

Figure 5:
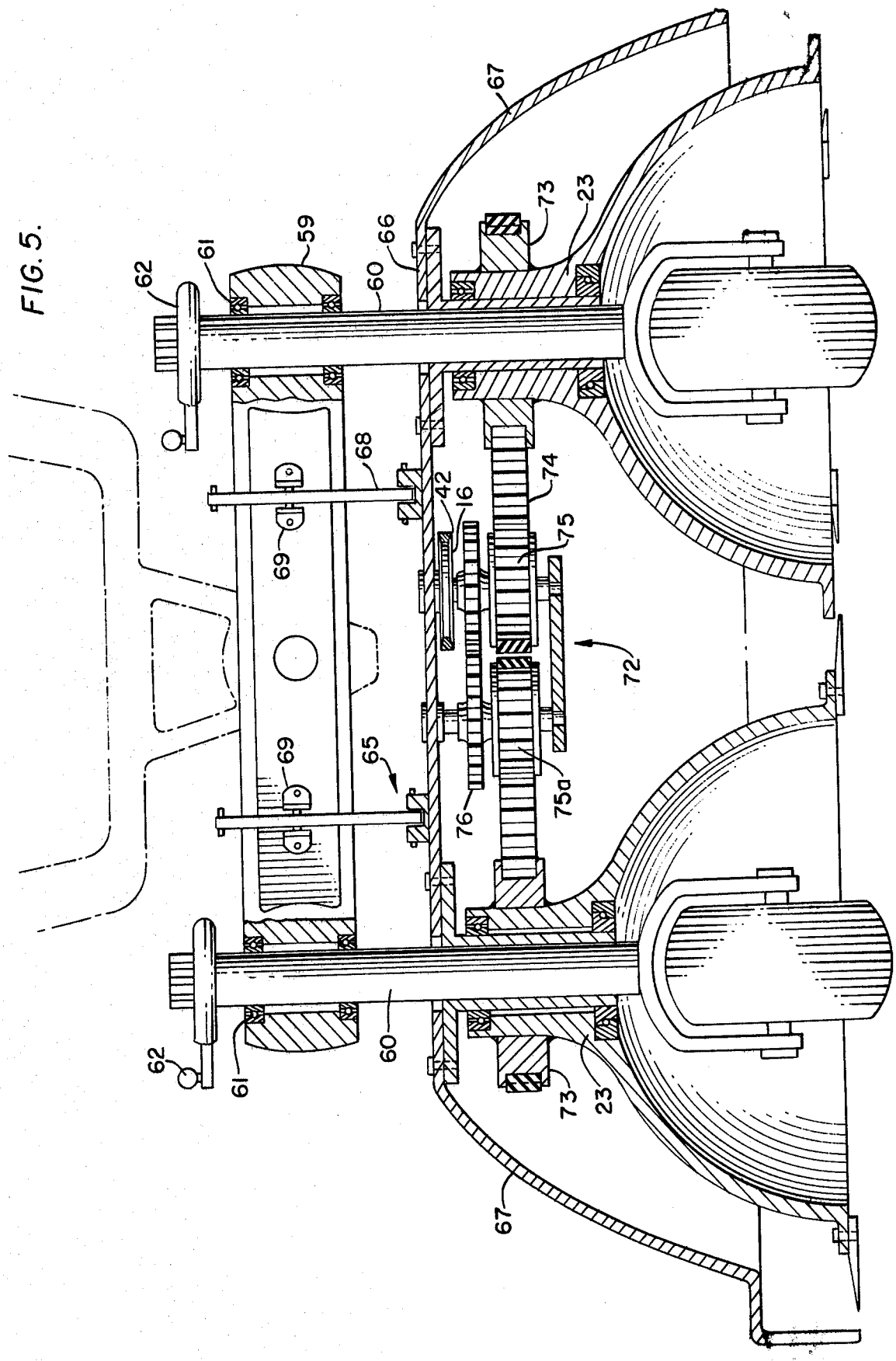
FIG. 5 is a front view of an apparatus similar to that shown in FIG. 4 wherein a pair of vertically adjustable cutting units are provided at the frontal end of the apparatus.

FIG. 5 is a frontal view of a mechanism similar to that shown in FIG. 4 which utilizes a pair of front ground-engaging wheels for widening the swath cut by the rotor mechanisms. In this particular mechanism, an elongated member 59 is used in a manner similar to that identified by reference numeral 54 in connection with FIG. 4. The member 59 is adapted to receive rotatably therein a pair of rotating steering members 60, each of which is journaled as by pairs of bearings 61 in the member 59. In the embodiment shown, steering knuckles 62 are provided at the uppermost end of each of the steering members 60 for steering, but such steering mechanisms may be coordinately connected to a steering wheel, such as in FIG. 4. The lowermost function is the same as that heretofore described in which the rotary cutting blades are provided in a sufficient distance to continuously cut grass along the ground and, in the alternative, the rotation of the respective blades might be such that there is a slight overlap between them to avoid clearly uncut areas.

As in FIG. 4, the entire unit is adjustable by means of a height-adjusting mechanism shown generally by the reference numeral 65. The height-adjusting means 65 includes an elongated top plate 66, the outer edges of which are secured to the guards 67. A pair of lifting arms 68 are secured to the top of the plate 66 through a bifurcated guide 69 on the member 59 to be secured to a height-adjusting mechanism such as that shown in FIG. 4. Specifically, each of the lifting arms may be secured to an arrangement of the type comprising the L-shaped member 48, the elongated member 49 and the adjustment handle 51.

A drive mechanism shown generally by the reference numeral 72 in this embodiment provides for the rotation of each of the cutters from a common source by a chain drive and sprocket mechanism driven by the motor. A sprocket 73 is secured to each of the upper portions 23 of the rotary mechanism for receiving a chain 74 driven by another sprocket 75. The first sprocket 75 is driven by the belt 42 about the driven pulley 16, while the other sprocket 75a is driven by a pair of meshed gears 76, one of which is also driven by the pulley 16.

A feature of the positive chain drive 72 is that the rotation of the blades on the cutter may be precisely controlled to permit overlap as described above without interference. In this embodiment, therefore, a pair of steering wheels, each of which is within a cutting mechanism, may be provided side by side, at either the forward or rearward portion of the apparatus. When so provided, the cutting mechanisms may be simultaneously raised or lowered as a unit in the manner previously discussed.

Figure 6:
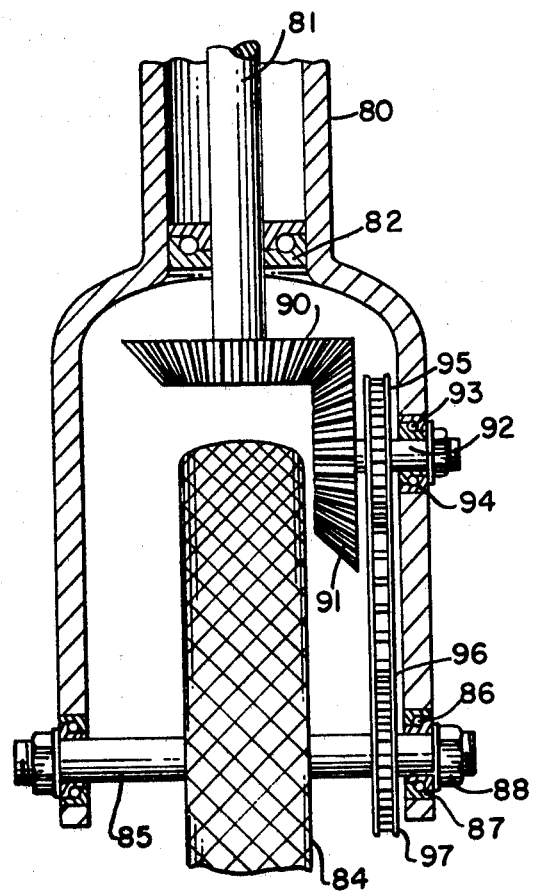
FIG. 6 is a sectional view of an individual drive mechanism for a steerable wheel of the apparatus.

FIG. 6 is a cross sectional view of an alternate embodiment utilized for individually driving each of the steerable wheels. In this embodiment, the bifurcated fork member 80 is provided with an opening therein at its upper end for receiving a rotating drive shaft 81 similar to the sleeve 24 as previously described. The drive shaft 81 is seated within the fork member 80 by one or more bearings 82. A wheel 84 is secured to an axle 85 provided within openings 86 in the respective lower ends of the fork 80. The axle 85 is rotatably mounted therein by bearings 87 and secured at its outermost ends by fasteners 88.

The lowermost end of the rotating drive shaft 81 is provided with a bevel gear 90 which mates at right angles thereto with the bevel gear 91 secured to a rotating axle 92 rotatably secured by bearings 93 in an opening 94 in the member 80. A sprocket 95 is located intermediate the bevel gear 91 and the inner wall of the lowermost end of the member 80 to which is secured a chain 96 secured to a second spindle 97 secured to the axis 85. The rotation of the member 81 causes the rotation of the bevel gear 90 and the rotation of the mating bevel gear 91. By rotating the chain drive mechanism in this matter, the drive wheel 84 may also be rotated to provide a wheel-like driving force with the general type of rotary mechanism as shown and described in connection with FIGS. 1–3. Such a wheel drive may be provided to each of the previously-described embodiments.

Figure 7:
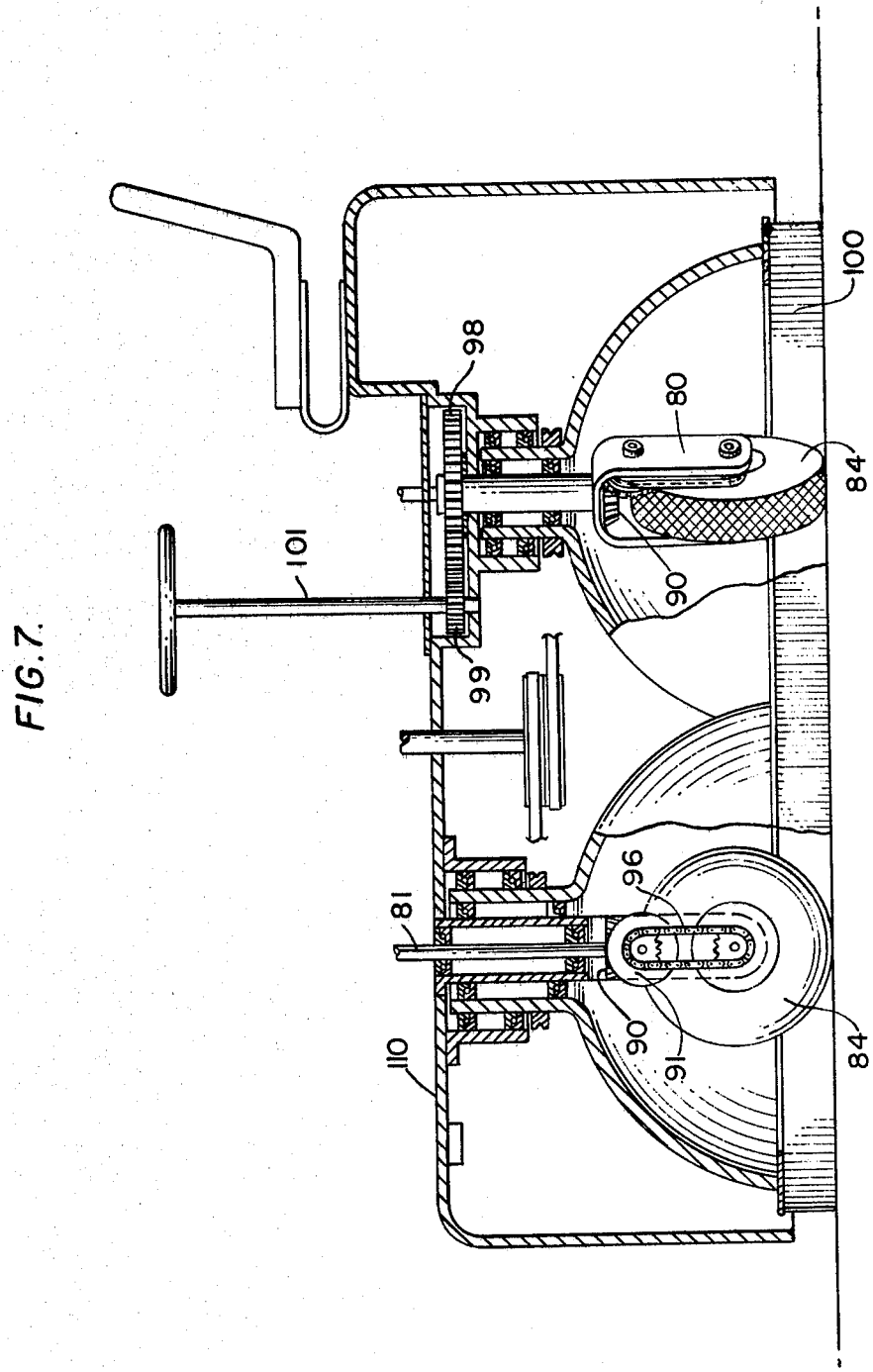
FIG. 7 is a partial side view, partially in section, of an alternate embodiment of the apparatus utilizing brushes and individual wheel drive units.

Such an embodiment would include wheel drive mechanisms as shown in FIG. 6 and has particular advantages in that the unit may be self-propelled rather than hand driven as shown in FIG. 2. Such a self-propelled unit has particular advantages in smaller types of mowers where the driving may be done in the steering mechanism and the ground support wheels 12 may be more in the nature of idler wheels. Still another advantage of such a mechanism is best illustrated in FIG. 7 showing how, in connection with a brush attachment, such wheels are individually steerable. The spindle portion of the pivotal fork member 80 is rotatably mounted in the frame and is connected to a first spur gear 98. The gear 98 meshes with and is rotated by a second spur gear 99 that is affixed to a steering shaft 101. When the steering shaft is turned, the gears operate to independently rotate the pivotal fork member 80. The ground-engaging wheels are individually steerable in such a mechanism on a brushing apparatus wherein a plurality of brushers 100 are secured to the rotating mechanism replacing the cutters as have been previously described. Such a device has a particular advantage in connection with closed areas for scrubbing floors and the like.

Figure 8:
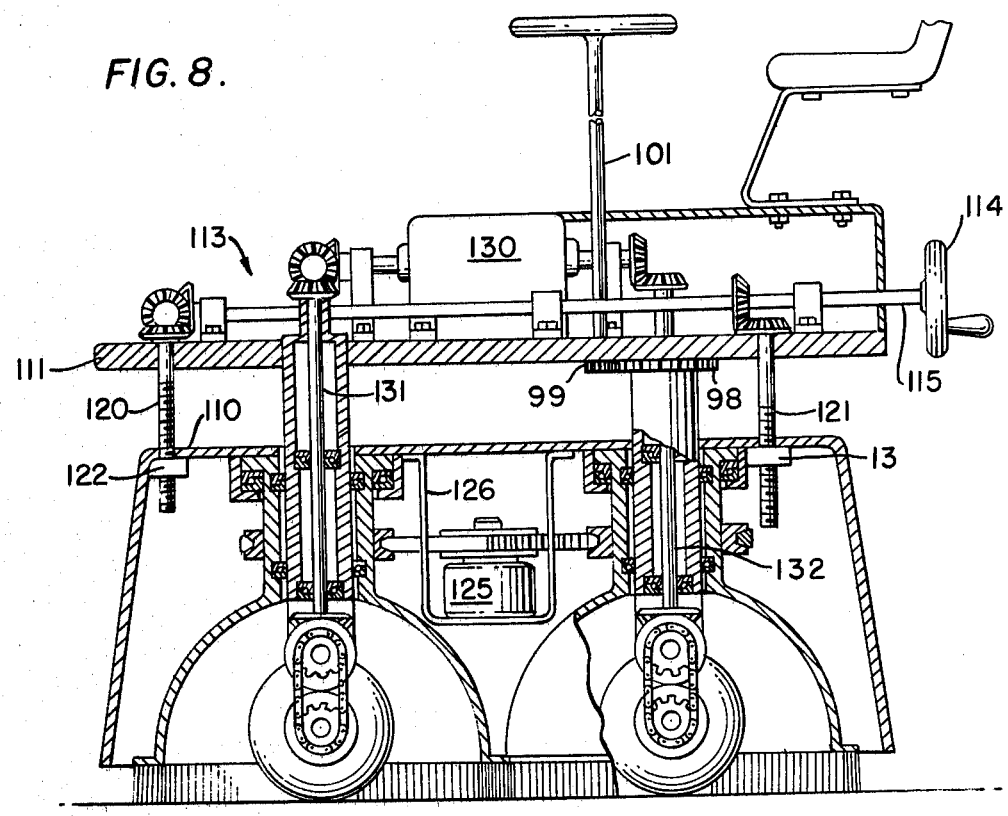
FIG. 8 is still another side cross sectional view of an alternate embodiment illustrating unit height adjustments and individual wheel drives.
Figure 9:
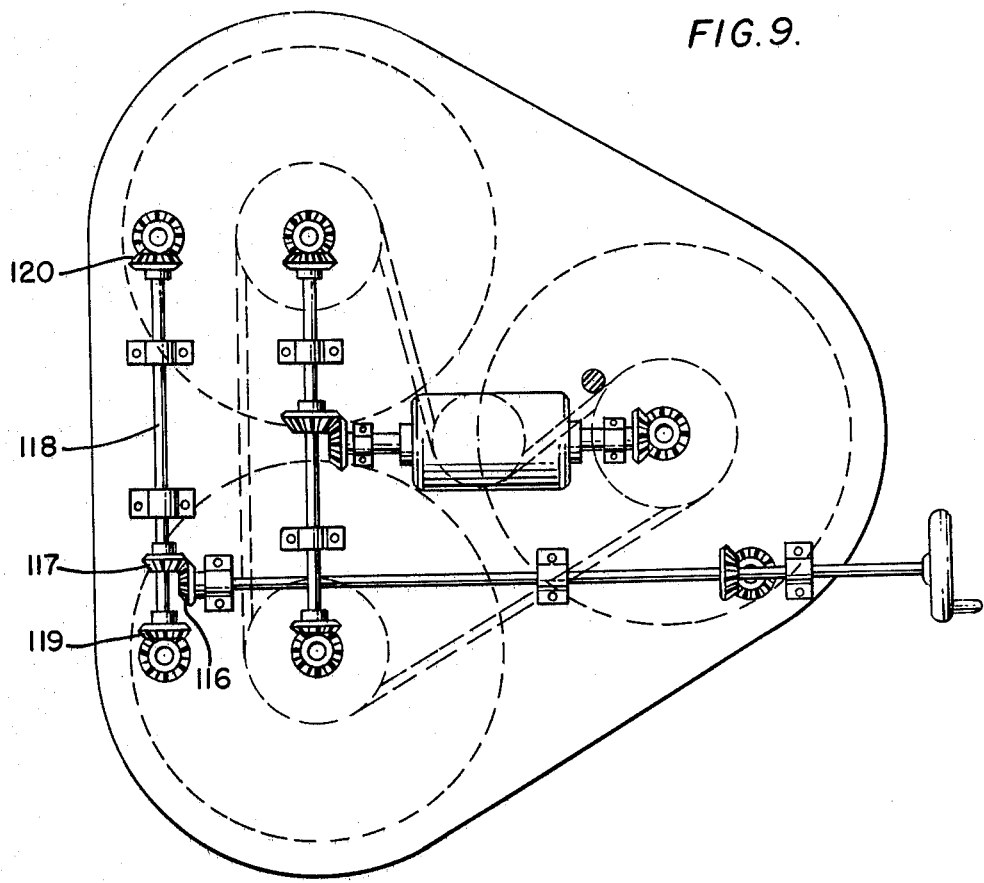
FIG. 9 is a top view of the unit as shown in FIG. 8 showing the adjustment mechanism in detail.

FIG. 8 illustrates an embodiment of the apparatus according to the invention which combines the individual wheel drive arrangements as previously described and the height adjustment arrangement as previously described, but in a slightly modified form, in an apparatus which includes three individually steerable ground-engaging wheels. To shorten this discussion, detailed description of FIGS. 8 and 9 is not believed to be necessary since the various features shown have largely been described previously in this specification. It is noteworthy in connection with FIG. 8 to observe that the upper member 110 is suspended from a rigid plate 111 forming a part of the body of the apparatus.

The height adjustment means are shown generally by the reference numeral 113 and comprise a plurality of interconnecting shafts and bevel gears. Specifically, a height adjusting handle 114 is secured to a shaft 115 having a bevel gear 116 at an end thereof for driving a mating bevel gear 117 to cause the shaft 118 to rotate. The rotation of the shaft 118 causes the bevel gears 119 and 120 at the respective ends thereof to rotate to cause a rotation of the respective height adjusting pins 120, 121 to raise or lower the plate 110. The pins 120, 121 are fixedly secured in mating fasteners 122 and 123 respectively secured beneath the plate 110. In this manner, the plate 110 and the connecting mechanisms may be raised or lowered in the manner previously described.

Moreover, the drive motor 125 is secured within a well 126 secured beneath the plate 110 for driving the rotary cutting mechanisms or brushing mechanisms in the manner previously described. Still further, the power source for driving the wheels 130 is located above the plate 111 and secured through bevel gears to drive the respective drive shafts 131 and 132.

It is an additional feature of this embodiment that each of the three wheels is driven, is located within the path of the surrounding brush, and can be individually steerable. Such a vehicle has significant advantages in working in close quarters and the like.

Figure 10:
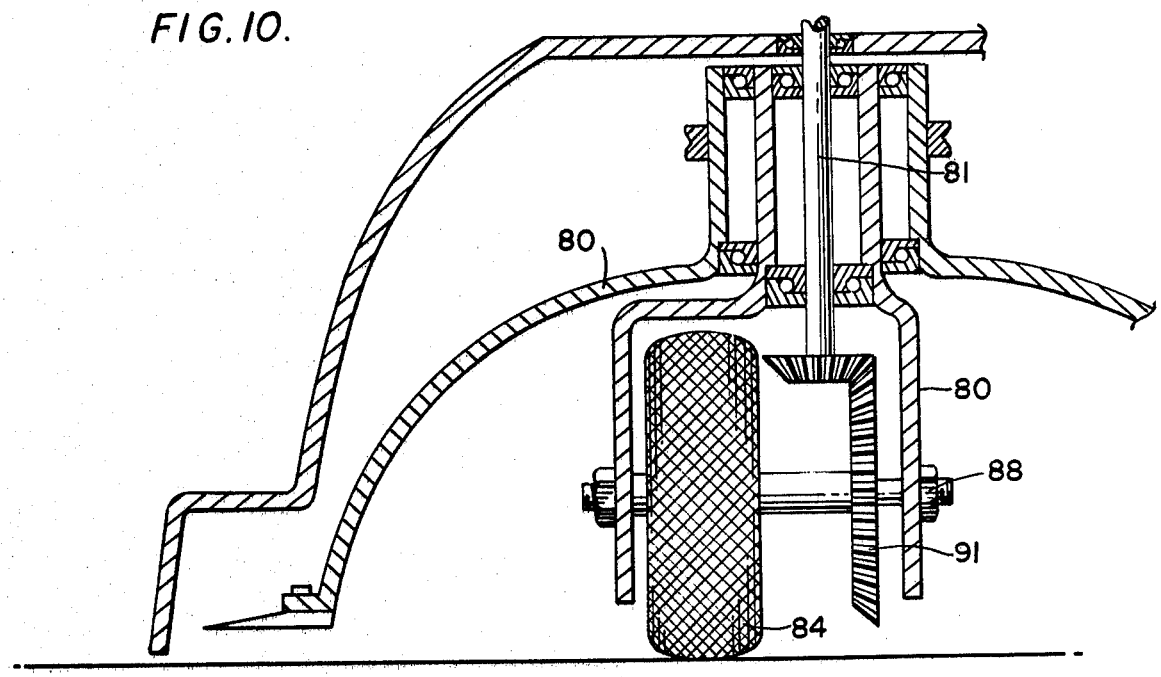
FIG. 10 is an alternate view of the embodiment shown in FIG. 6 in which the wheel drive mechanism is offset in shape.

FIG. 10 is an alternate embodiment of the apparatus of FIG. 6 incorporating like reference numerals for like parts. In this embodiment, the wheel 84 is offset from the vertical centermost position and one of the arms of the bifurcated fork is elongated accordingly. In operation, the embodiment of FIG. 10 operates the same as that described in connection with FIG. 6.

Figure 11:
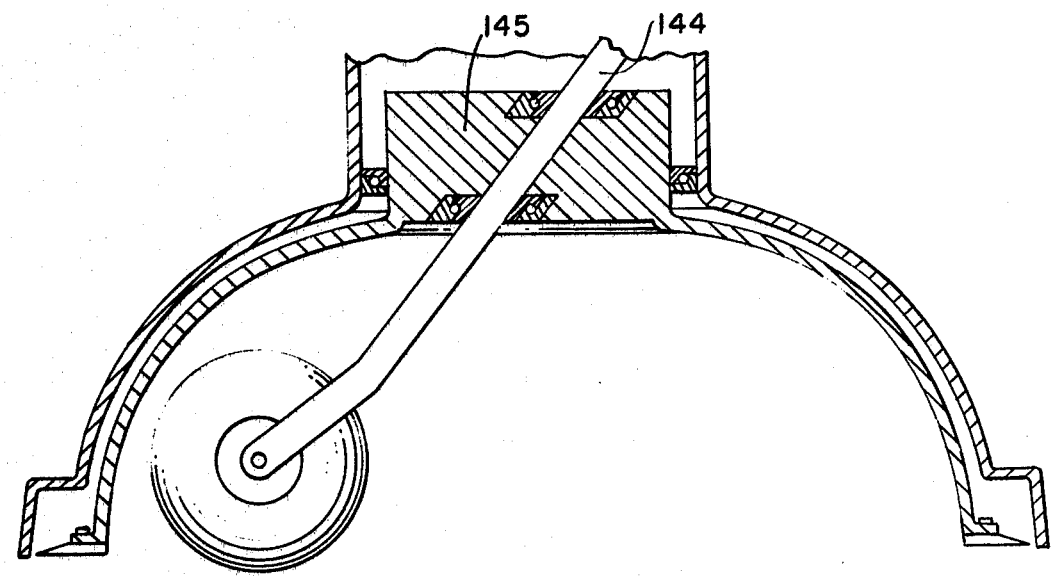
FIG. 11 is a side view, partially in section, showing a rotary mechanism in a caster-like arrangement wherein the ground-engaging wheel is canted.

The embodiment of FIG. 11 operates in the same manner as the basic construction previously described in connection with FIGS. 1-3; thus, only a portion thereof is shown. The significant feature illustrated by FIG. 11 is that the sleeve 144 is canted or at an angle with respect to the vertical and passes through a bearing block 145 having a canted opening therein to receive the sleeve 144. The outer portions of the bearing block 145 are journaled within the body portion in the same manner as that described in connection with FIG. 2, for example.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A lawn mower comprising:
a body, including a plurality of ground-engaging wheels and a frame which includes a hood member secured to said frame, said hood member including a lower portion and an upwardly extending generally cylindrical upper portion adapted to receive a rotatable member therein;
a bell-shaped rotatable cutting member including grass cutting means secured to a main portion thereof, said rotatable cutting member including a sleeve portion extending vertically from a top part of said main portion and rotatably secured in a journaled relationship by at least a pair of bearings within and spaced along said upper portion of said hood member, the rotation of said cutting means defining a path contained within the area of said lower portion of said hood member, said cutting means including a flange portion extending outwardly from a bottom edge of said main portion, and a plurality of blades secured at spaced intervals to said flange portion;
power means supported on said body for rotating said rotatable member to perform work by the rotation of said grass cutting means at a predetermined position relative to ground;
a spindle operatively connected to at least one of said ground-engaging wheels and including a portion rotatably journaled substantially entirely within and closely adjacent to the sleeve portion of said rotatable member along substantially the entire length thereof by at least a second pair of bearings spaced along said sleeve portion of said rotatable member, said first and said second pairs of bearings being on a common axis, whereupon said one wheel is rotatable within the area circumscribed by the rotation of said work portion of said rotatable member; and
means secured to said frame and to said hood member for adjusting the cutting height of said cutting means as a unit which includes said hood member.

2. A lawn mower according to claim 1 wherein a bottom portion of said hood member is formed as an annular channel in which the blades of said cutting means revolve.

3. A lawn mower according to claim 2 further comprising a plurality of fan blades secured to a bottom part of said conical portion of said cutting means and positioned so as to revolve within said annular channel of said hood.

4. The power apparatus as defined in claim 1 wherein said body includes means for driving at least one of said plurality of ground-engaging wheels by a chain drive mechanism comprising a bevel gear for driving a sprocket engaging a chain which engages said wheel.

5. A lawn mower according to claim 1 further comprising steering means operatively connected to ground-engaging wheel means.

6. A lawn mower according to claim 5 wherein said lawn mower includes at least a pair of said rotatable members and a pair of said spindles of a pair of ground-engaging wheels respectively journaled within said pair of rotatable members, said steering wheels being operatively connected to steer each of said pair of ground-engaging wheels.

7. The lawn mower of claim 1 wherein said height adjusting means includes a pivotable member secured at one end to said hood member and at the other to an adjusting member; a handle secured to said adjusting member and to said frame; said pivotable member including a pivot member secured to said frame, said height adjusting means being arranged to permit said bearings to raise or lower relative to the spindle during adjustment.

8. A rideable type lawn mower comprising:

a body, including a plurality of ground-engaging wheels and a frame which includes a hood member secured to said frame, said hood member including a lower portion and an upwardly extending generally cylindrical upper portion adapted to receive a rotatable member therein;

a bell-shaped rotatable cutting member including grass cutting means secured to a main portion thereof, said rotatable cutting member including a sleeve portion extending vertically from a top part of said main portion and rotatably secured in a journaled relationship by at least a pair of bearings within and spaced along said upper portion of said hood member, the rotation of said cutting means defining a path contained within the area of said lower portion of said hood member, said cutting means including a flange portion extending outwardly from a bottom edge of said main portion, and a plurality of blades secured at spaced intervals to said flange portion;

power means supported on said body for rotating said rotatable member to perform work by the rotation of said grass cutting means at a predetermined position relative to ground; and a canted spindle operatively connected to at least one of said ground-engaging wheels and including a portion rotatably journaled substantially entirely within and closely adjacent to the sleeve portion of said rotatable member along substantially the entire length thereof by at least a second pair of bearings spaced along said sleeve portion of said rotatable member, said first and said second pair of bearings being on a common axis, whereupon said one wheel is castered and rotatable within the area circumscribed by the rotation of said work portion of said rotatable member; and means secured to said frame and to said hood member for adjusting the cutting height of said cutting means as a unit which includes said hood member.

9. The lawn mower of claim 8 wherein said height adjusting means includes a pivotable member secured at one end to said hood member and at the other to an adjusting member; a handle secured to said adjusting member and to said frame; said pivotable member including a pivot member secured to said frame, said height adjusting means being arranged to permit said bearing to raise or lower relative to the spindle during adjustment.

* * * * *

UNITED STATES PATENT AND TRADEMARK OFFICE
CERTIFICATE OF CORRECTION

PATENT NO. : 4,084,395
DATED : April 18, 1978
INVENTOR(S) : William G. Nannen

It is certified that error appears in the above-identified patent and that said Letters Patent are hereby corrected as shown below:

Column 1, line 48, "rotary" should read -- rotatably --;

Column 4, line 43, "unwardly" should read -- upwardly--;

Column 6, line 31, "axis" should read -- axle --;
and

Column 8, line 56, "wheels" should read -- means --.

Signed and Sealed this

Tenth Day of October 1978

[SEAL]

Attest:

RUTH C. MASON
Attesting Officer

DONALD W. BANNER
Commissioner of Patents and Trademarks